United States Patent
Feneis et al.

(10) Patent No.: US 6,919,558 B2
(45) Date of Patent: Jul. 19, 2005

(54) POSITIONING APPARATUS AND ASSEMBLY THEREOF

(75) Inventors: Jeffrey E. Feneis, Loveland, CO (US); Ron L. King, Loveland, CO (US); Thomas W. Holmquist, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 10/167,554

(22) Filed: Jun. 10, 2002

(65) Prior Publication Data

US 2003/0226957 A1 Dec. 11, 2003

(51) Int. Cl.⁷ ................................................ G01D 5/34
(52) U.S. Cl. ........................... 250/231.13; 250/231.14; 324/207.25
(58) Field of Search ....................... 250/231.13, 231.14, 250/232, 233, 216; 324/207.25, 207.22, 207.2, 207.21, 207.11, 173, 174; 341/13, 15

(56) References Cited

U.S. PATENT DOCUMENTS

| | | | | |
|---|---|---|---|---|
| 5,081,756 A | * | 1/1992 | Abe et al. | 29/593 |
| 6,297,629 B1 | | 10/2001 | Peilloud | 324/207.25 |

FOREIGN PATENT DOCUMENTS

| | | | |
|---|---|---|---|
| DE | 3337612 | 4/1985 | |
| EP | 0177711 | 4/1986 | |
| EP | 0280390 | 8/1988 | |
| JP | 402147815 A | 6/1990 | G01D/5/36 |

* cited by examiner

Primary Examiner—Kevin Pyo

(57) ABSTRACT

A positioning apparatus and method for assembling the same on a rotating member. An embodiment of the positioning apparatus comprises an encoder having index markings indicative of the rotational position of the rotating member, a decoder for reading the index markings from the encoder when the encoder is mounted to the rotating member at a desired distance from the decoder to determine the rotational position of the rotating member, and at least one spacer for mounting the encoder on the rotating member at the desired distance from the decoder.

3 Claims, 5 Drawing Sheets

POSITIONING APPARATUS AND ASSEMBLY THEREOF

FIELD OF THE INVENTION

The invention generally pertains to motors, and more specifically, to positioning apparatus and methods for assembly thereof.

BACKGROUND OF THE INVENTION

Motors are commonly used to drive a variety of devices. Some motors move devices between two positions, such as motors that open and close the tray on compact disc (CD) and digital video disc (DVD) players. These motors may be operated to open or close the tray until a switch is triggered that shuts power to the motor (i.e., when the tray is fully opened or closed). Other motors, however, may be used to drive devices between a variety of different positions, and therefore a simple switching scheme may be inadequate to control the motor.

By way of illustration, one or more motors may be provided to drive the cartridge-access device of a media storage library to the various cartridge storage slots and to the read/write device therein. These motors may need to be more accurately controlled for efficient use of the media storage system. For example, where the user desires to write and/or read data on a particular data cartridge, the position of the cartridge-access device must be known so that it may be moved adjacent the desired cartridge storage slot to retrieve the desired data cartridge, and then moved to the read/write device to load it therein for read and/or write operations.

Encoders/decoders are available for determining rotational movement of a motor, and hence the position of a device being driven by the motor (e.g., the cartridge-access device). An encoder is typically mounted to a rotating member operatively associated with the motor (e.g., a motor shaft) and may have index markings thereon indicating fractional (or complete) revolutions of the rotating member that are read by the decoder to determine the rotational movement of the motor. However, the encoder must be assembled so that it is accurately spaced from the decoder, usually within very tight tolerances (e.g., within 0.015 inches of the desired spacing). Failure to assemble the encoder within the required tolerance may cause the decoder to improperly focus on the index markings, and may thus result in false readings and improper positioning of the driven device.

The encoder may be assembled on the rotating member using finely-calibrated machinery. For example, an assembly arm may be calibrated to press an encoder wheel onto the rotating member so that the encoder is assembled at the desired spacing from the decoder. However, this machinery is expensive and must be accurately calibrated before use, and frequently checked for proper calibration during use, which is time-consuming and slows production. Alternatively, the encoder may be manually assembled by measuring the distance between the encoder and decoder as the encoder is pressed onto the rotating member. However, this is a time-consuming process and is prone to human error. Often, the encoder cannot be manually assembled within the tight tolerances required by some encoder/decoder assemblies.

SUMMARY OF THE INVENTION

An embodiment of a positioning apparatus comprises an encoder having index markings indicative of the rotational position of the rotating member, a decoder for reading the index markings from the encoder when the encoder is mounted to the rotating member at a desired distance from the decoder to determine the rotational position of the rotating member, and at least one spacer for mounting the encoder on the rotating member at the desired distance from the decoder.

An embodiment of a method for assembling an encoder/decoder comprises positioning the encoder on a rotating member, and sliding the encoder along the length of the rotating member until at least one spacer stops the encoder from sliding and the encoder is at a desired distance from the decoder.

BRIEF DESCRIPTION OF THE DRAWINGS

Illustrative and presently preferred embodiments of the invention are illustrated in the drawings, in which.

DETAILED DESCRIPTION

Figure 1:
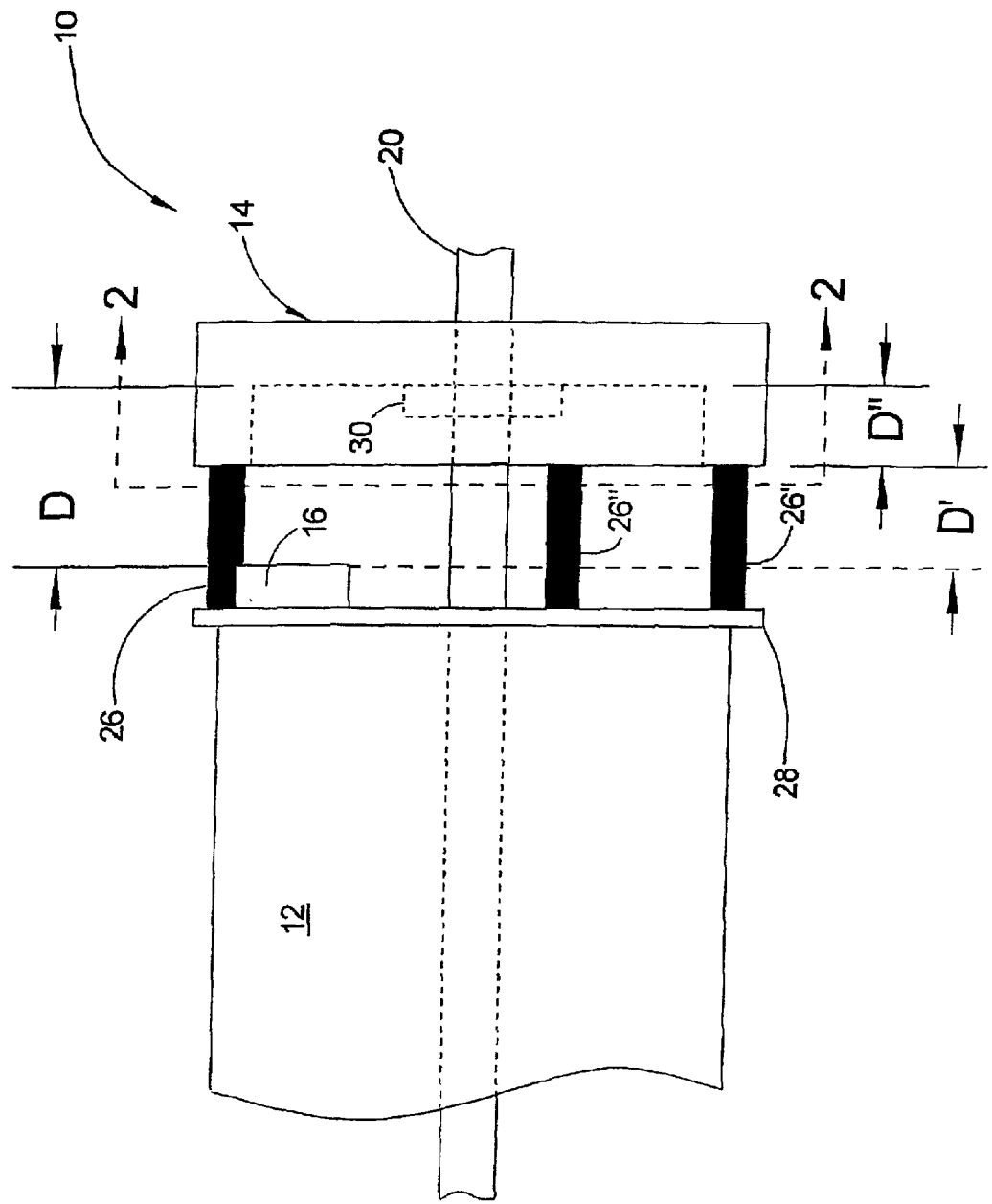
FIG. 1 is a side view of a positioning apparatus according to one embodiment of the invention having an encoder mounted on a rotating member at a predetermined distance from a decoder.

Encoder/decoder assemblies are often provided for tracking rotational movement of a rotating member 20 operatively associated with a motor 12 (e.g., the motor shaft shown in FIG. 1). The rotational movement may be used to determine the location and/or speed of the device that is being driven by motor 12 based on the rotational movement of the rotating member 20.

The sensitivity and control of motor 12 is proportional to the number of index markings 22 on encoder 14. Generally, more index markings 22 allow greater sensitivity and control of the motor 12. However, as the number of index markings 22 on encoder 14 increases, the resolution of decoder 16 must also be increased so that decoder 16 can distinguish the index markings 22 from one another. The resolution of decoder 16 may be enhanced by accurately spacing encoder 14 from decoder 16 (i.e., at predetermined distance D) so that decoder 16 can focus on and read each of the index markings 22 as the rotating member 20 rotates.

According to the teachings of the invention, a positioning apparatus 10 is disclosed wherein encoder 14 and decoder 16 are spaced from one another within predetermined positional tolerances. One embodiment of the positioning apparatus 10 is shown assembled to a motor 12 in FIG. 1. Motor 12 produces rotational movement of the rotating member 20. The rotational movement of the rotating member 20 may be translated (e.g., using gears, belts, etc.) to drive a device (not shown), such as to drive a cartridge-access device to various positions within a media storage library.

Decoder 16 may be mounted to motor 12, such as on the printed circuit substrate or circuit board 28. Additional circuitry (e.g., connection 17 in FIG. 3) may also be provided on the circuit board 28 for powering and signaling the motor 12. Encoder 14 may be mounted on the rotating member 20 so that it is a predetermined or desired distance D (FIG. 1) from decoder 16. For example, desired distance D may be distance D' from decoder 16 to the edge of encoder wheel 14' where spacers 26, 26', and 26" are mounted in addition to the distance D" that the index markings 22 (FIG. 2) are inset within the encoder wheel 14' (e.g., to reduce external glare on the index markings 22).

It is understood that both the predetermined distance D, and assembly tolerances may vary under the teachings of the present invention, and in other embodiments, may depend on design considerations. Such design considerations may include, but are not limited to, transmission and receiving capabilities of encoder 14 and/or decoder 16, the respective power requirements of decoder 16, the signal detection capability of decoder 16, the number and spacing of the index markings 22, motor speed, etc.

Furthermore, while the invention is illustrated herein with respect to motor 12, such as may be used for driving a cartridge-access device in a media storage library, the teachings of the invention are also applicable to other motors. It is understood that motor 12 is not limited to any particular use, size, output, or other characterization thereof.

Figure 2:
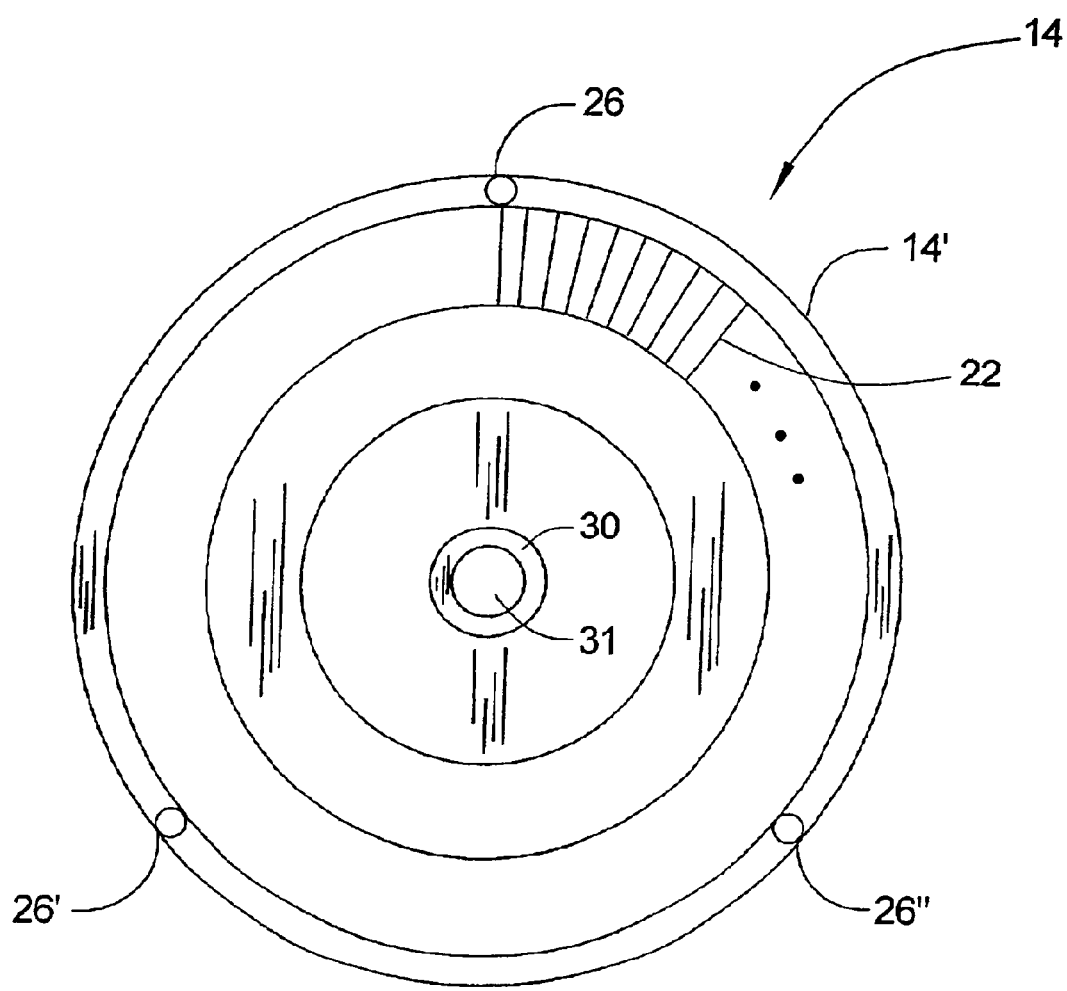
FIG. 2 is a plan view of the encoder taken along line 2—2 in FIG. 1 according to one embodiment of the invention.

A preferred embodiment of encoder 14 is shown in FIG. 2, which shows a plan view of encoder 14 taken along line 2—2 in FIG. 1. According to this embodiment, encoder 14 may comprise a disc or a wheel 14' having a number of index markings 22 thereon. In addition, an opening 31 may be formed through the wheel 14', as defined by inner perimeter 30. Preferably, opening 31 is sized so that the encoder wheel 14' may be slid or pressed onto the rotating member 20, as will be explained in more detail below.

According to preferred embodiments of the invention, the encoder wheel 14' is made of a stiff plastic or other suitable material or composite. As such, the encoder wheel 14' is durable and maintains its shape with extended use so that the index markings 22 are not distorted. In addition, the encoder wheel 14' is preferably manufactured of a lightweight material to reduce the burden on the motor 12. It is understood, however, that the encoder wheel 14' may be made of any suitable material.

The encoder wheel 14' also preferably tightly fits onto the rotating member 20 so that the encoder wheel 14' and the rotating member 20 move together with one another and do not slip with respect to one another. Optionally, the encoder wheel 14' and the rotating member 20 may comprise a pin and slot arrangement to prevent slipping therebetween. Other embodiments are also contemplated as being within the scope of the invention, and may vary based on design considerations, such as a rotating member 20 having a polygon-shaped configuration as opposed to the cylindrical or circular configuration shown and described herein.

The index markings 22 are preferably printed on a reflective surface (e.g., a thin metal film) having an adhesive backing, which may be mounted to the encoder wheel 14'. However, it is understood that in other embodiments, the index markings 22 may be printed on or otherwise provided directly on the encoder wheel 14' itself.

Encoder 14 may also comprise at least one spacer 26 mounted thereto. In a preferred embodiment, such as that shown in FIG. 2, encoder 14 may comprise three spacers or posts 26, 26', and 26" that are equally positioned about the perimeter of the encoder wheel 14'. Such an arrangement facilitates even positioning of the encoder wheel 14' against circuit board 28 so that the index markings 22 are all at the desired distance D from decoder 16 as each of the index markings 22 pass over decoder 16 during operation.

Spacers 26, 26', and 26" are preferably made from the same material as, and molded as part of the encoder wheel 14'. However, in other embodiments, spacers 26, 26', and 26" may be manufactured of different material than that of the encoder wheel 14' and separately mounted thereto in any suitable manner. For example, the encoder wheel 14' may comprise openings formed therein so that spacers 26, 26', and 26" may be inserted therethrough. Also for example, spacers 26, 26', and 26" may be otherwise mounted to the encoder wheel 14' using suitable connectors and/or adhesive.

Although a preferred embodiment of the encoder wheel 14' and spacers 26, 26', and 26" thereon, is shown and described with respect to FIG. 2, it is understood that in other embodiments any number of spacers 26 may be provided. In addition, at least one spacer 26 may be any suitable size or geometry, and need not be cylindrical, as shown and described herein with respect to the preferred embodiments. For example, at least one spacer 26 may be configured as a partial hub surrounding all of, or a portion of the perimeter of the encoder wheel 14'. Indeed, the length of at least one spacer 26 may vary depending on various design considerations. For example, the length of at least one spacer 26 may vary based on the distance D" that encoder 14 is inset within the encoder wheel 14',the height of decoder 16 above the surface of circuit board 28, etc.

In still other embodiments, the spacer(s) 26 need not contact circuit board 28. For example, the spacer 26 may be sized to abut a formation on circuit board 28, such as a post or column mounted on circuit board 28 (or otherwise mounted on motor 12). Although preferably the spacer 28 does not abut against and contact the circuitry (e.g., decoder 16, connector 17), as doing so may damage the circuitry, such embodiments are also contemplated as being within the scope of the invention.

Figure 3:
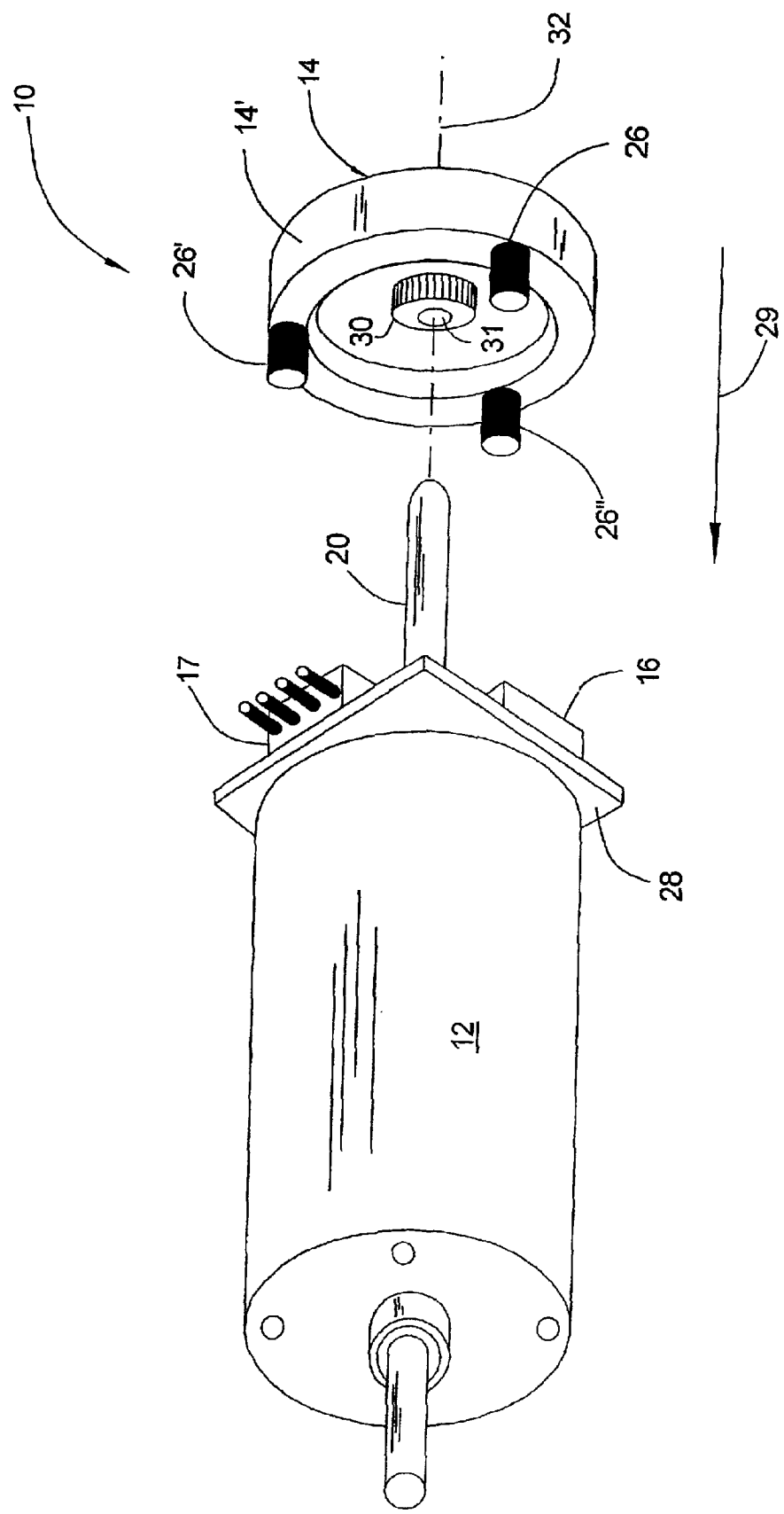
FIG. 3 is an exploded perspective view of a motor and a positioning apparatus according to one embodiment of the invention.
Figure 4:
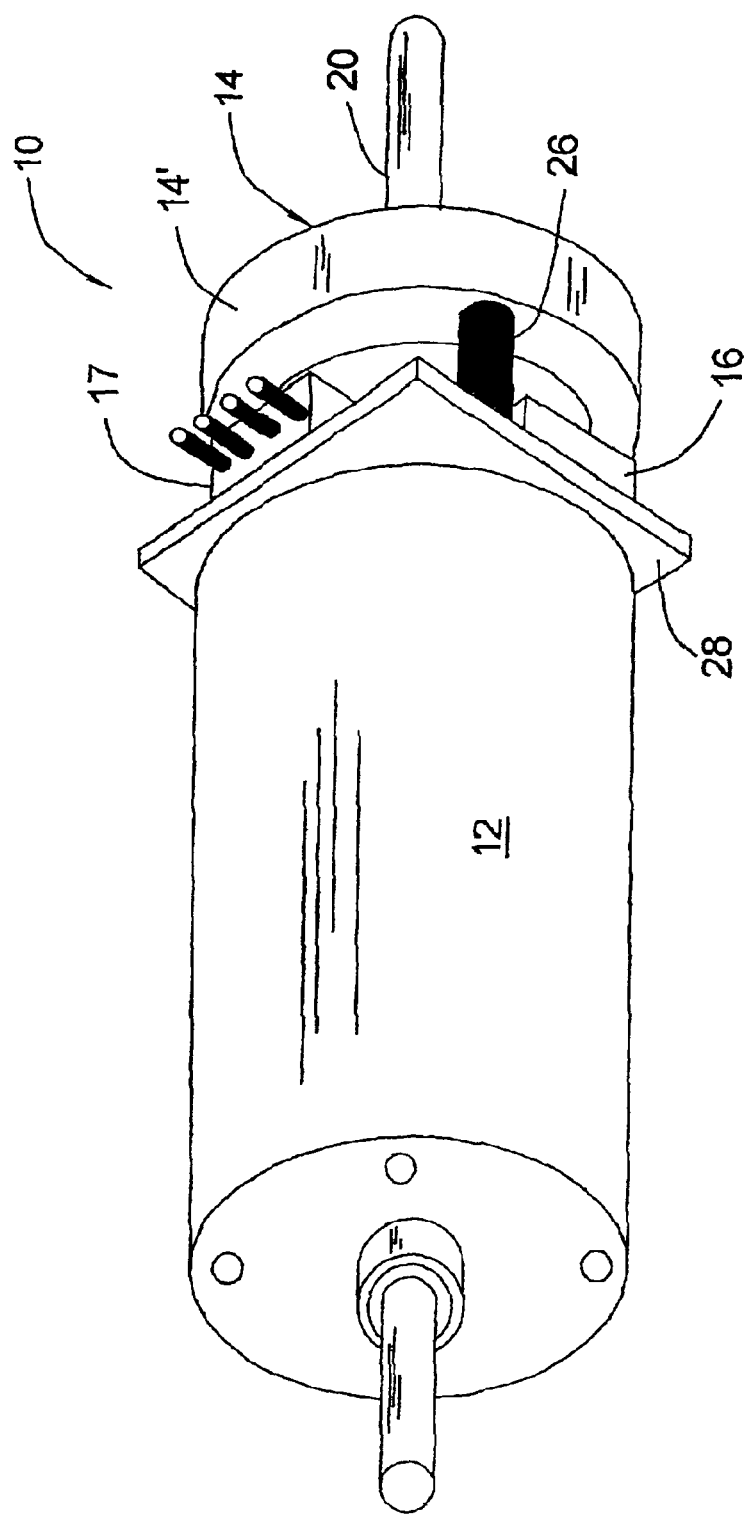
FIG. 4 is a perspective view of the positioning apparatus and the motor in FIG. 3 shown assembled according to one embodiment of the invention.
Figure 5:
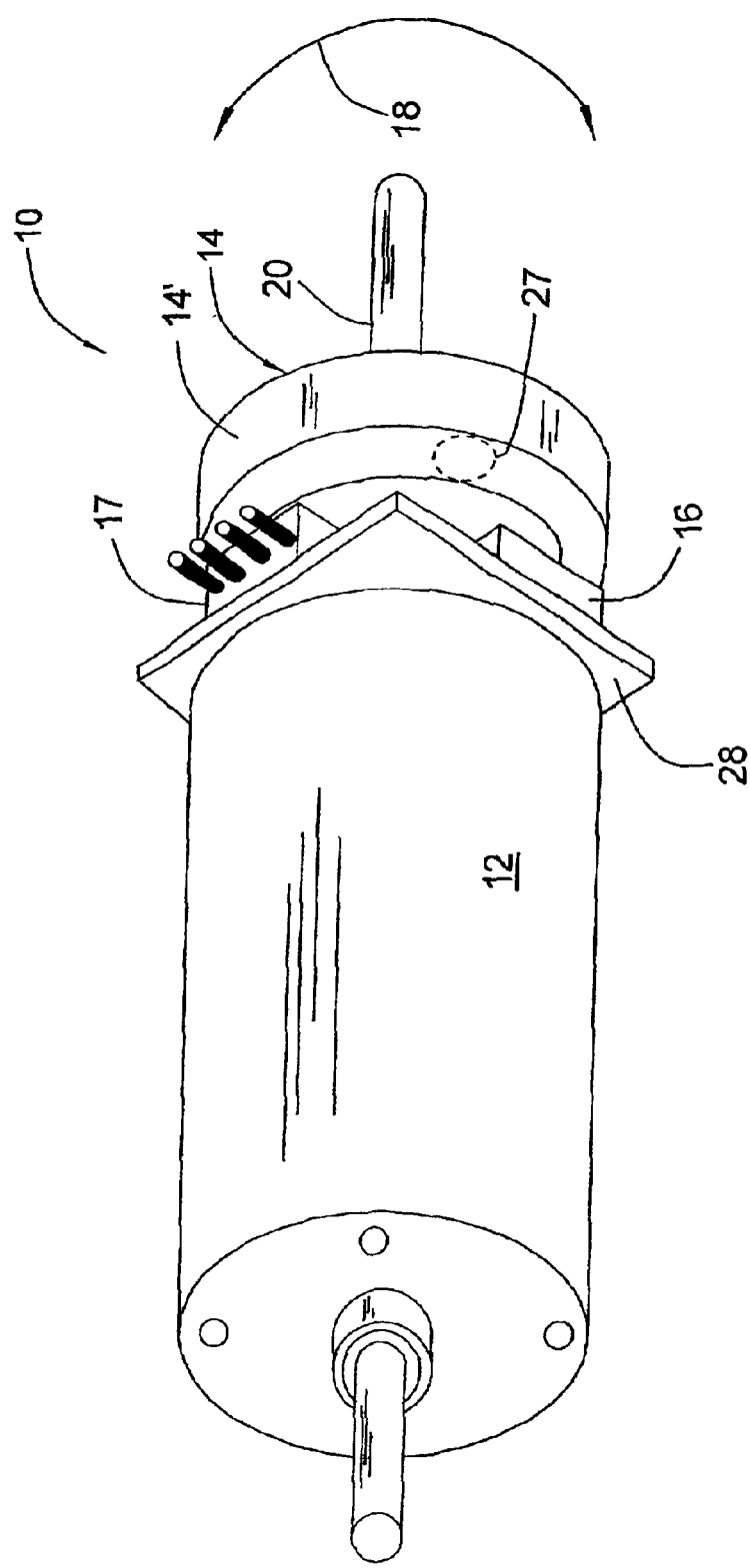
FIG. 5 is a perspective view of the positioning apparatus and the motor in FIG. 4 shown with a spacer removed according to one embodiment of the invention.

Assembly of the positioning apparatus 10 is illustrated according to one embodiment of the invention with reference to FIG. 3, FIG. 4, and FIG. 5. An exploded perspective view of the motor 12 and the positioning apparatus 10 is shown in FIG. 3 according to one embodiment of the invention. Preferably, the encoder wheel 14' is positioned so that opening 31 formed through the encoder wheel 14' is aligned with rotating member 20 (e.g., along center-line 32). The encoder wheel 14' may then be fit onto rotating member 20 and moved or slid along the length thereof in the direction of arrow 29. The encoder wheel 14' may be rotated so that the one spacer(s) 26 does not interfere with the circuitry on circuit board 28 (e.g., decoder 16, electrical connector 17, or the like). The encoder wheel 14 may then be pressed or slid into place until it is stopped by the spacer 26 when it abuts circuit board 28, as shown in FIG. 4.

A perspective view of the positioning apparatus 10 and motor 12 is shown assembled according to one embodiment of the invention in FIG. 4, wherein spacer 26 abuts circuit board 28. That is, the at least one spacer 26 stops the encoder wheel 14 from being further slid or pressed onto the rotating member 20. Accordingly, encoder 14 may be assembled on rotating member 20 at the predetermined distance D, previously discussed with respect to FIG. 1, without the need to carefully measure and adjust the position of the encoder wheel 14' on the rotating member 20.

Encoder wheel 14' may be suitably mounted to rotating member 20 to prevent rotational slipping (i.e., in the direction of arrows 18 in FIG. 5) and/or lateral slipping (i.e., along the centerline 32 (FIG. 3) of rotating member 20) of the encoder wheel 14' during operation. For example, the diameter of opening 31 formed in the encoder wheel 14' may be sized so that it is tightly press-fit and frictionally engages rotating member 20, as shown in FIG. 4. However, other embodiments are also contemplated as being within the scope of the invention, and may comprise use of an adhesive, a pin, or other suitable retainer for securing the encoder wheel 14' to the rotating member 20 at the desired position D.

Optional removal of at least one spacer 26 is shown and described with respect to a preferred embodiment in FIG. 5, and as may be appropriate or desired in some circumstances. For example, spacer 26 may be removed after encoder 14 is mounted distance D from decoder 16. Moreover, when at least one of the spacers 26 may interfere with the operation of the positioning apparatus 10, at least one spacer 26 may be removed, as shown in FIG. 5.

According to the embodiment for removing spacer 26 shown in FIG. 5, spacer 26 may be manufactured so that it readily breaks apart from encoder disc 14 at the base thereof, as indicated by dashed-line 27. For example, spacer 26 may be perforated to "break" at its base. Alternatively, spacer 26 may be cut or otherwise removed at its base or other location on spacer 26, for example, using a knife, saw, scissor, laser, or other suitable tool. In any event, at least a portion of one spacer 26 is preferably removed so that the encoder wheel 14' may freely rotate (e.g., in the direction(s) of arrow 18), and so that it does not interfere with operation of motor 12. In other embodiments, an opening may be formed through the encoder wheel 14', wherein the spacer 26 may be pressed through the encoder wheel 14' to retract or remove it therefrom.

Although preferred embodiments of the positioning apparatus 10 have been shown and described herein, it is to be understood that the teachings of the invention are not to be limited to any particular configuration shown and described herein. For example, in other embodiments, the index markings 22 shown herein on the encoder wheel 14' may instead be on a pulley or a gear on the rotating member 20 and need not necessarily be provided on a separate wheel 14'. Where the circuitry is encased (e.g., within the motor 12), the spacer 26 may be sized to abut the casing instead of circuit board 28. As yet another example, the positioning apparatus 10 may instead be assembled on another shaft linked to the motor 12.

Furthermore, it should be noted that although the positioning apparatus 10 and method of assembly thereof according to embodiments of the present invention are illustrated using a particular encoder 14 and decoder 16, the teachings of the invention may be utilized with any of a wide range of encoder/decoder systems now known in the art or that may be developed in the future (e.g., radio frequency (RF), inductive, optical, etc.).

It is readily apparent that the positioning apparatus 10 of the present invention allows encoder 14 to be assembled on rotating member 20 at a predetermined distance D from decoder 16, without the need for expensive, finely calibrated machinery. Accordingly, encoders 14 may be quickly and repeatedly assembled on rotating members 20 at the predetermined or desired distance D. Encoder 14 may even be readily manually assembled.

What is claimed is:

1. A method for assembling an encoder and a decoder, comprising:

positioning said encoder on a rotating member; and sliding said encoder along the length of aid rotating member until at least one spacer stops said encoder from sliding and said encoder is at a desired distance from said decoder; and removing at least a portion of said at least one spacer after said encoder is at said desired distance from said decoder.

2. The method of claim 1, wherein sliding said encoder stops when said at least one spacer abuts a motor assembly.

3. The method of claim 2, wherein sliding said encoder stops when at least one spacer abuts a circuit board on said motor assembly.

* * * * *